(12) United States Patent
Dhakal et al.

(10) Patent No.: US 9,876,600 B2
(45) Date of Patent: *Jan. 23, 2018

(54) METHODS, SYSTEMS, AND COMPUTER PROGRAM PRODUCTS FOR CALIBRATING PHASE HARDWARE-INDUCED DISTORTION IN A CELLULAR COMMUNICATIONS SYSTEM

(71) Applicant: Collision Communications, Inc., Peterborough, NH (US)

(72) Inventors: Sagar Dhakal, Bedford, NH (US); Joseph Farkas, Merrimack, NH (US); Brandon Hombs, Merrimack, NH (US); Seyedmehdi S. Nokhodberiz, Nashua, NH (US)

(73) Assignee: COLLISION COMMUNICATIONS, INC., Peterborough, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/357,221

(22) Filed: Nov. 21, 2016

(65) Prior Publication Data

US 2017/0070311 A1     Mar. 9, 2017

Related U.S. Application Data

(63) Continuation of application No. 14/708,586, filed on May 11, 2015, now Pat. No. 9,503,207.

(51) Int. Cl.
*H04J 11/00*     (2006.01)
*H04B 7/0456*    (2017.01)
(Continued)

(52) U.S. Cl.
CPC ........ *H04J 11/0053* (2013.01); *H04B 7/0456* (2013.01); *H04B 7/0602* (2013.01);
(Continued)

(58) Field of Classification Search
CPC ........ H04B 17/11; H04B 17/12; H04B 17/13; H04B 17/14; H04B 7/0456; H04B 7/0602;
(Continued)

(56) References Cited

U.S. PATENT DOCUMENTS 5,530,449 A    6/1996  Wachs
9,503,207 B1 * 11/2016  Dhakal ............. H04B 17/12
(Continued)

OTHER PUBLICATIONS

Afshin Haghighat, "UE Calibration in MIMO Systems", Sep. 2012, Vehicular Technology Conference (VTC Fall), 2012 IEEE, pp. 1-4.
(Continued)

*Primary Examiner* — Sophia Vlahos (57) ABSTRACT

Methods and systems are described for calibrating phase hardware-induced distortion in a cellular communications system. In one aspect, an estimate of a phase difference at a user equipment (UE) between downlink channels including signals sent over two or more BS transmitter chains is obtained. A phase difference between uplink channels including signals received over two or more BS receiver chains is determined. A relative phase distortion induced by two or more BS transceiver chains is determined based on the received estimate of phase difference between downlink channels and the determined phase difference between uplink channels.

24 Claims, 5 Drawing Sheets

(51) Int. Cl.

| | | |
|---|---|---|
| *H04B 7/06* | (2006.01) | |
| *H04B 17/12* | (2015.01) | |
| *H04L 27/36* | (2006.01) | |
| *H04W 56/00* | (2009.01) | |
| *H04L 5/00* | (2006.01) | |
| *H04W 72/04* | (2009.01) | |
| *H04B 7/0452* | (2017.01) | |
| *H04B 17/14* | (2015.01) | |
| *H04W 84/04* | (2009.01) | |
| *H04W 88/02* | (2009.01) | |
| *H04W 88/08* | (2009.01) | |

(52) U.S. Cl.
CPC ........... *H04B 7/0626* (2013.01); *H04B 17/12* (2015.01); *H04L 5/005* (2013.01); *H04L 27/367* (2013.01); *H04W 56/001* (2013.01); *H04W 72/042* (2013.01); *H04W 72/0413* (2013.01); *H04B 7/0452* (2013.01); *H04B 17/14* (2015.01); *H04W 84/042* (2013.01); *H04W 88/02* (2013.01); *H04W 88/08* (2013.01)

(58) Field of Classification Search
CPC . H04B 7/0626; H04B 7/0452; H04J 11/0053; H04L 5/005; H04L 27/367; H04W 72/0413; H04W 72/042; H04W 84/042; H04W 88/08
See application file for complete search history.

(56) References Cited

U.S. PATENT DOCUMENTS

| | | |
|---|---|---|
| 2005/0047384 A1 | 3/2005 | Wax et al. |
| 2005/0141459 A1 | 6/2005 | Li et al. |
| 2011/0134774 A1 | 6/2011 | Pelletier et al. |
| 2012/0300864 A1 | 11/2012 | Merlin et al. |
| 2013/0058424 A1 | 3/2013 | Enescu et al. |
| 2014/0269554 A1 | 9/2014 | Shapira et al. |
| 2015/0195795 A1 | 7/2015 | Loehr et al. |

OTHER PUBLICATIONS

"Evolved Universal Terrestrial Radio Access (E-UTRA); Physical Channels and Modulation," 3GPP TS 36.211 version 10.0.0 Release 10, (Jan. 2011) 105 pages.

"Evolved Universal Terrestrial Radio Access (E-UTRA); Physical Layer Procedures," 3GPP TS 36.213 version 10.1.0 Release 10, (Mar. 2011) 115 pages.

"Evolved Universal Terrestrial Radio Access (E-UTRA) User Equipment (UE) Radio Transmission and Reception," 3GPP TS 36.101 version 10.3.0 Release 10 (Jun. 2011) 236 pages.

Hou, X., et al., "Experimental Study of Advanced MU-MIMO Scheme With Antenna Calibration for the Evolving LTE TDD System," IEEE 23rd International Symposium on Personal Indoor and Mobile Radio Communications (PIMRC), Sep. 9-12, 2012, pp. 2443-2448.

Guey, J-C., et al., "Modeling and Evaluation of MIMO Systems Exploiting Channel Reciprocity in TDD Mode," Vehicular Technology Conference, 2004 VTC2004—Fall 2004 IEEE 60th, Sep. 26-29, 2004, vol. 6, pp. 4265-4269.

Burns, N.E., "Reciprocity Calibration of TDD Smart Antenna Systems," Antennas and Propagation Society International Symposium (APSURSI), Jul. 11-17, 2010, Toronto, Ontario, pp. 1-4.

Spencer, Q. H., et al., "Zero-Forcing Methods for Downlink Spatial Multiplexing in Multiuser MIMO Channels," IEEE Transactions on Signal Processing, vol. 52, No. 2, Feb. 2004, pp. 461-471.

* cited by examiner

$$\begin{pmatrix} 1 & 0 & \cdots & 0 \\ 0 & e^{-i\rho_{12}} & \cdots & 0 \\ \vdots & \vdots & \ddots & \vdots \\ 0 & 0 & \cdots & e^{-i\rho_{1N}} \end{pmatrix}$$

*FIG. 5A*

$$\begin{pmatrix} e^{i\gamma_1} e^{i\phi_{11}} e^{i\lambda} \\ e^{i\gamma_2} e^{i\phi_{12}} e^{i\lambda} \\ \vdots \\ e^{i\gamma_N} e^{i\phi_{1N}} e^{i\lambda} \end{pmatrix}$$

*FIG. 5B*

$$\eta \begin{pmatrix} e^{i\kappa} e^{i\phi_{11}} e^{i\delta_1} \\ e^{i\kappa} e^{i\phi_{12}} e^{i\delta_2} \\ \vdots \\ e^{i\kappa} e^{i\phi_{1N}} e^{i\delta_N} \end{pmatrix}$$

*FIG. 5C*

METHODS, SYSTEMS, AND COMPUTER PROGRAM PRODUCTS FOR CALIBRATING PHASE HARDWARE-INDUCED DISTORTION IN A CELLULAR COMMUNICATIONS SYSTEM

RELATED APPLICATIONS

This application is a continuation of U.S. Pat. No. 9,503,207, titled "METHODS, SYSTEMS, AND COMPUTER PROGRAM PRODUCTS FOR CALIBRATING PHASE HARDWARE-INDUCED DISTORTION IN A LONG TERM EVOLUTION COMMUNICATIONS SYSTEM," filed May 11, 2015, the disclosure of which is incorporated by reference. This application is related to U.S. patent application Ser. No. 14/708,588, titled "METHODS, SYSTEMS, AND COMPUTER PROGRAM PRODUCTS FOR CALIBRATING AMPLITUDE HARDWARE-INDUCED DISTORTION IN A LONG TERM EVOLUTION COMMUNICATIONS SYSTEM," and U.S. patent application Ser. No. 14/708,595, titled "METHODS, SYSTEMS, AND COMPUTER PROGRAM PRODUCTS FOR CALIBRATING HARDWARE-INDUCED DISTORTION IN A COMMUNICATIONS SYSTEM," both filed May 11, 2015, the entire disclosure of both of which are here incorporated by reference.

BACKGROUND

The 3GPP long term evolution (LTE) Rel. 8 and later standards define various transmission schemes for communication systems equipped with multiple transmit antennas and multiple receive antennas. Multi-user multiple input multiple output (MU-MIMO) is a set of advanced multiple-input and multiple-output, technologies where the available antennas are spread over a multitude of independent access points, such as base stations, and independent terminals—each having one or more antennas. To enhance the communication capabilities of all terminals, MU-MIMO applies an extended version of space-division multiple access (SDMA) to allow multiple transmitters to send separate signals and multiple receivers to receive separate signals simultaneously in the same band.

One transmission scheme is downlink beamforming, where multiple antennas at the enodeB (eNB), also referred to herein as a base station (BS), transmit to multiple user equipments (UEs) using the same time-frequency resource. The LTE Rel. 10 standard defines a codebook for up to eight transmit antennas per BS.

Beamforming is a signal processing technique involving directional signal transmission or reception. This is achieved by combining elements in a phased array in such a way that signals at particular angles experience constructive interference while others experience destructive interference. Beamforming can be used at both the transmitting and receiving ends in order to achieve spatial selectivity. In a centralized radio access network (C-RAN), multiple transmit antennas across multiple BS can be utilized to jointly beamform over a large geographic area. The C-RAN system has the potential to provide a significant gain in spectral efficiency and better network coverage. However, co-channel interference, if not efficiently controlled or cancelled, limits these advantages.

Channel state information (CSI), which refers to known channel properties of a communication link, can be used to control co-channel interference. This information describes how a signal propagates from the transmitter to the receiver and represents the combined effect of, for example, scattering, fading, and power decay with distance, making it possible to adapt transmissions to current channel conditions. CSI is typically estimated at the receiver and quantized and fed back to the transmitter.

A transmit beamforming algorithm can preemptively remove or reduce the interference in a MU-MIMO system. Block diagonalization and zero-forcing are two well-known beamforming techniques that utilize the downlink channel state information (DL-CSI) of users to perform linear precoding of their signals before transmission in order to cancel the co-channel interference. The performance of these beamforming techniques rely on the accuracy of the DL-CSI. Phase hardware-induced distortion that is introduced by BS transceiver chains (which includes the BS transmitter components and the BS receiver components), however, prevents an accurate determination of DL-CSI.

Accordingly, there exists a need for methods, systems, and computer program products for calibrating phase hardware-induced distortion in an LTE communications system.

SUMMARY

Methods and systems are described for calibrating phase hardware-induced distortion in a cellular communications system. In one aspect, an estimate of a phase difference at a user equipment (UE) between downlink channels including signals sent over two or more BS transmitter chains is obtained. A phase difference between uplink channels including signals received over two or more receiver chains used by the BSs is determined. A relative phase distortion induced by two or more BS transceiver chains is determined based on the received estimate of phase difference between downlink channels and the determined phase difference between uplink channels.

BRIEF DESCRIPTION OF THE DRAWINGS

Advantages of the claimed invention will become apparent to those skilled in the art upon reading this description in conjunction with the accompanying drawings, in which like reference numerals have been used to designate like or analogous elements, and in which:

DETAILED DESCRIPTION

Figure 1:
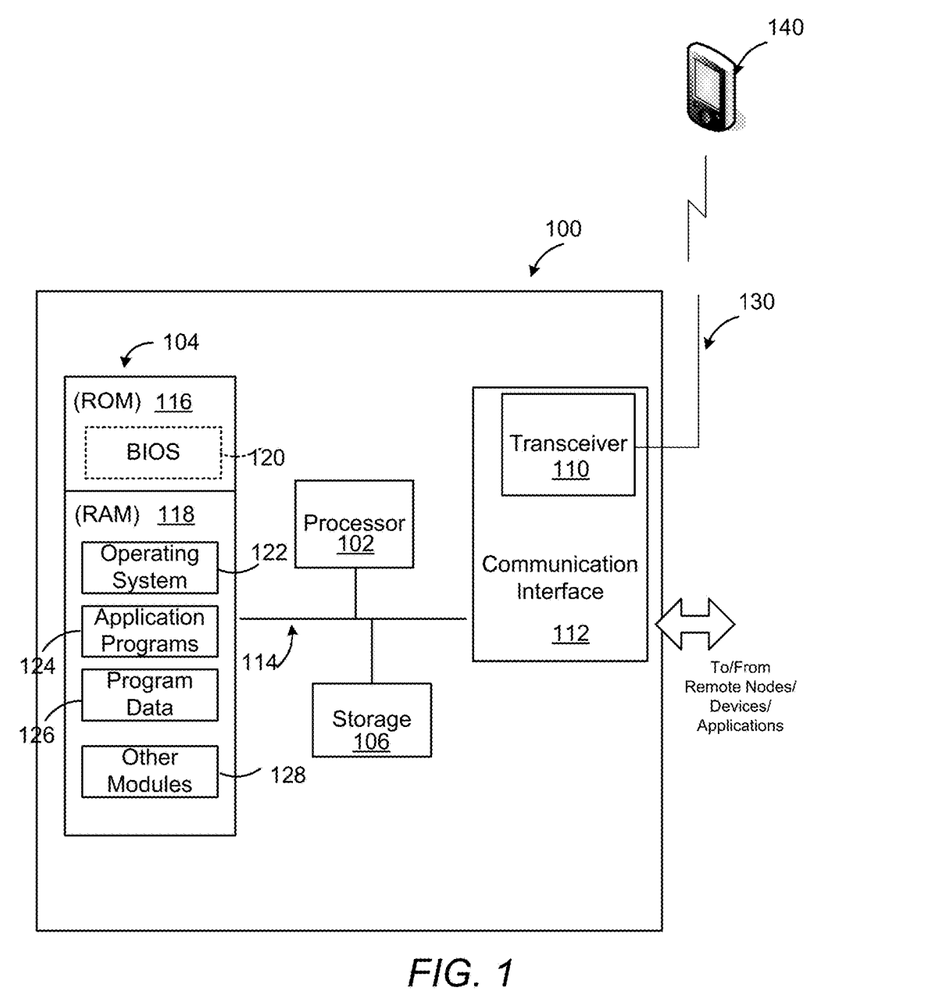
FIG. 1 is a block diagram illustrating an exemplary hardware device in which the subject matter may be implemented.

Prior to describing the subject matter in detail, an exemplary hardware device in which the subject matter may be implemented shall first be described. Those of ordinary skill in the art will appreciate that the elements illustrated in FIG. 1 may vary depending on the system implementation. With reference to FIG. 1, an exemplary system for implementing the subject matter disclosed herein includes a hardware device 100, including a processing unit 102, memory 104, storage 106, transceiver 110, communication interface 112, and a bus 114 that couples elements 104-112 to the processing unit 102.

The bus 114 may comprise any type of bus architecture. Examples include a memory bus, a peripheral bus, a local bus, etc. The processing unit 102 is an instruction execution machine, apparatus, or device and may comprise a microprocessor, a digital signal processor, a graphics processing unit, an application specific integrated circuit (ASIC), a field programmable gate array (FPGA), etc. The processing unit 102 may be configured to execute program instructions stored in memory 104 and/or storage 106.

The memory 104 may include read only memory (ROM) 116 and random access memory (RAM) 118. Memory 104 may be configured to store program instructions and data during operation of device 100. In various embodiments, memory 104 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. Memory 104 may also include nonvolatile memory technologies such as nonvolatile flash RAM (NVRAM) or ROM. In some embodiments, it is contemplated that memory 104 may include a combination of technologies such as the foregoing, as well as other technologies not specifically mentioned. When the subject matter is implemented in a computer system, a basic input/output system (BIOS) 120, containing the basic routines that help to transfer information between elements within the computer system, such as during start-up, is stored in ROM 116.

The storage 106 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 100. It is noted that the methods described herein can be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 106, ROM 116 or RAM 118, including an operating system 122, one or more applications programs 124, program data 126, and other program modules 128.

The hardware device 100 may be part of a base station and/or C-RAN (not shown) configured to communicate with mobile devices in a communication network. A base station may also be referred to as an eNodeB, an access point, and the like. A base station typically provides communication coverage for a particular geographic area. A base station and/or base station subsystem may cover a particular geographic coverage area referred to by the term "cell." A network controller (not shown) may be communicatively connected to base stations and provide coordination and control for the base stations. Multiple base stations may communicate with one another, e.g., directly or indirectly via a wireless backhaul or wireline backhaul.

The hardware device 100 may operate in a networked environment using logical connections to one or more remote nodes via communication interface 112, including communicating with one or more mobile devices via a transceiver 110 connected to an antenna 130. The mobile devices can be dispersed throughout the network 100. A mobile device may be referred to as user equipment (UE), a terminal, a mobile station, a subscriber unit, or the like. A mobile device may be a cellular phone, a personal digital assistant (PDA), a wireless modem, a wireless communication device, a handheld device, a laptop computer, a wireless local loop (WLL) station, a tablet computer, or the like. A mobile device may communicate with a base station directly, or indirectly via other network equipment such as, but not limited to, a pico eNodeB, a femto eNodeB, a relay, or the like.

The remote node may be a computer, a server, a router, a peer device or other common network node, and typically includes many or all of the elements described above relative to the hardware device 100. The communication interface 112, including transceiver 110 may interface with a wireless network and/or a wired network. For example, wireless communications networks can include, but are not limited to, Code Division Multiple Access (CDMA), Time Division Multiple Access (TDMA), Frequency Division Multiple Access (FDMA), Orthogonal Frequency Division Multiple Access (OFDMA), and Single-Carrier Frequency Division Multiple Access (SC-FDMA). A CDMA network may implement a radio technology such as Universal Terrestrial Radio Access (UTRA), Telecommunications Industry Association's (TIA's) CDMA2000®, and the like. The UTRA technology includes Wideband CDMA (WCDMA), and other variants of CDMA. The CDMA2000® technology includes the IS-2000, IS-95, and IS-856 standards from The Electronics Industry Alliance (EIA), and TIA. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, and the like. The UTRA and E-UTRA technologies are part of Universal Mobile Telecommunication System (UMTS). LTE and LTE-Advance (LTE-A) are newer releases of the UMTS that use E-UTRA. UTRA, E-UTRA, UMTS, LTE, LTE-A, and GAM are described in documents from an organization called the "3rd Generation Partnership Project" (3GPP). CDMA2000® and UMB are described in documents from an organization called the "3rd Generation Partnership Project 2" (3GPP2). The techniques described herein may be used for the wireless networks and radio access technologies mentioned above, as well as other wireless networks and radio access technologies.

Other examples of wireless networks include, for example, a BLUETOOTH network, a wireless personal area network, and a wireless 802.11 local area network (LAN). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, communication interface 112 may include logic configured to support direct memory access (DMA) transfers between memory 104 and other devices.

In a networked environment, program modules depicted relative to the hardware device 100, or portions thereof, may be stored in a remote storage device, such as, for example, on a server. It will be appreciated that other hardware and/or software to establish a communications link between the hardware device 100 and other devices may be used.

It should be understood that the arrangement of hardware device 100 illustrated in FIG. 1 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) can be realized, in whole or in part, by at least some of the components illustrated in the arrangement of hardware device 100. In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 1. Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description that follows, the subject matter will be described with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is being described in the foregoing context, it is not meant to be limiting as those of skill in the art will appreciate that various of the acts and operation described hereinafter may also be implemented in hardware.

To facilitate an understanding of the subject matter described below, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly contradicted by context.

Figure 4:
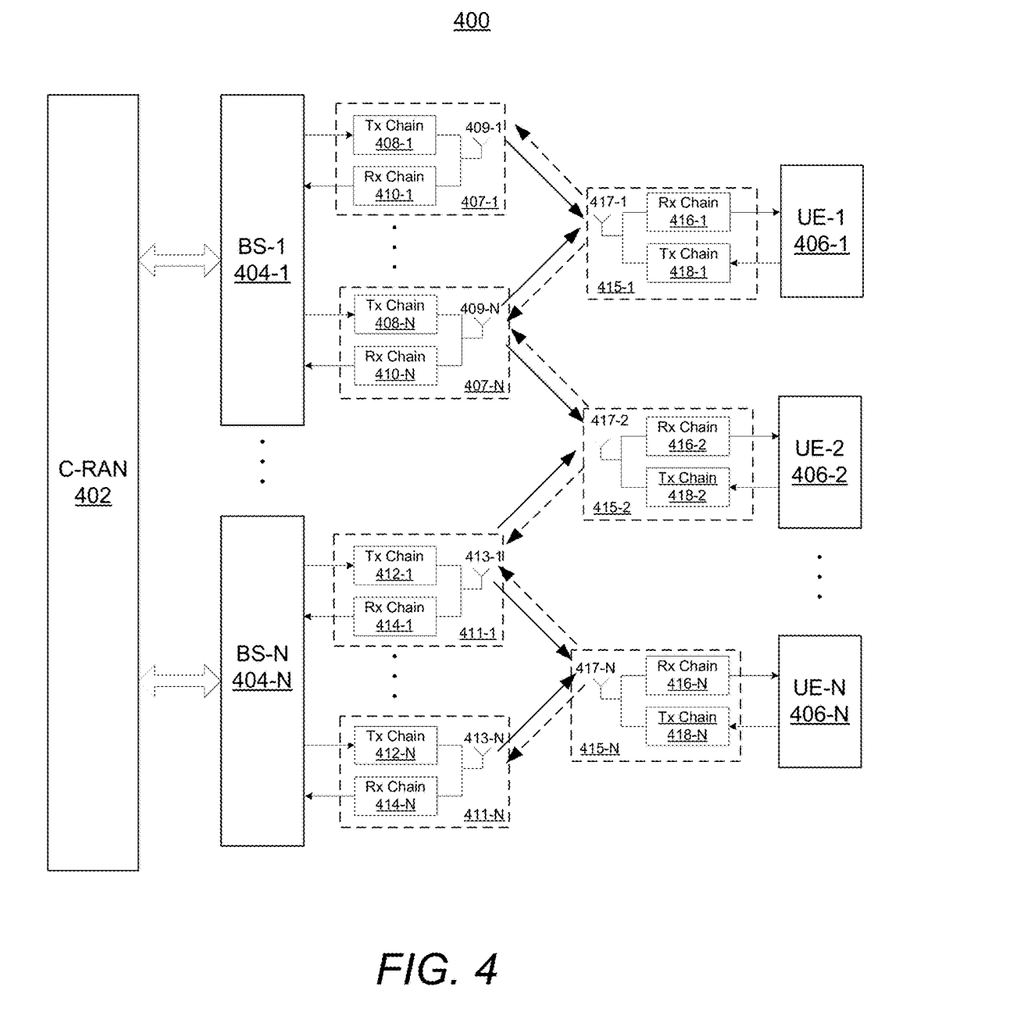
FIG. 4 is a block diagram illustrating a configuration for a MU-MIMO communications system according to another aspect of the subject matter described herein.

FIG. 4 illustrates one configuration for a MU-MIMO communications system 400. The C-RAN 402 communicates with one or more BSs 404-1 to 404-N, which in turn transmit downlink signals (shown with solid lines) to UEs 406-1 to 406-N via BS transmit chains 408-1 to 408-N and 412-1 to 412-N and receive uplink signals (shown with dashed lines) from UEs 406-1 to 406-N via BS receive chains 410-1 to 410-N and 414-1 to 414-N, both via respective associated antennas 409-1 to 409-N and 413-1 to 413-N, correspondingly. UEs 406-1 to 406-N receive downlink signals from BSs 404-1 to 404-N via UE receive chains 416-1 to 416-N and transmit uplink signals to BSs 404-1 to 404-N via UE transmit chains 418-1 to 418-N, both via respective associated antennas 417-1 to 417-N, correspondingly. A transmit chain includes the components necessary to transmit a signal and a receive chain includes all the components necessary to receive a signal. Transmit and receive chains together make up a transceiver chain 407. For example, BS transmit chain 408-1, antenna 409-1, and BS receive chain 410-1 together make up a BS transceiver chain 407-1. Similarly, UE transmit chain 418-1, antenna 417-1, and UE receive chain 416-1 together make up a UE transceiver chain 415-1. As can be appreciated, in a MU-MIMO system, multiple input and out antennas are employed and thus multiple transceiver chains are employed.

Each BS 404 is communicatively coupled to C-RAN 402 such that certain operations may be performed by the BS 404, by the C-RAN 402, or by a combination of both. Each BS 404 may, in some embodiments, be considered a part of the C-RAN 402 such that operations performed at a BS 404 are performed by the C-RAN 402 by extension.

Various operations are described herein with respect to a particular BS 404. It should be understood that these operations may be performed by multiple BS's 404 each with respective or the same UEs 406 and that these multiple operations may be aggregated by the C-RAN 402 for the purposes of hardware-induced phase distortion calibration or any other operation described herein.

In order to perform MU-MIMO beamforming for an LTE based C-RAN, an accurate estimate of DL-CSI is needed. Generally speaking, DL-CSI can be determined roughly from knowledge of the uplink channel state information (UL-CSI) due to reciprocity between the uplink and downlink air propagation channels. The UL-CSI from UEs 406 to BSs 404 is obtained at the BSs 404 by channel estimation using received sounding reference signal (SRS) symbols. In order to derive an accurate DL-CSI from the UL-CSI, however, compensation for the effects of hardware-induced phase distortion that is introduced by transceiver chains at one or more BSs should be considered. More particularly, each BS 404 antenna suffers from a random phase distortion induced by its transceiver chain. By way of example, respective to BS-1 404-1, the transmit chain 408-1 can introduce a random phase distortion $\delta_1$ to a signal transmitted via its associated antenna 409-1 and the receive chain 410-1 can introduce a random phase distortion Ti to a signal received via its associated antenna 409-1. Similarly, the transmit chain 408-N can introduce a random phase distortion $\delta_N$ to a signal transmitted via its associated antenna 409-N and the receive chain 410-N introduces a random phase distortion TN to a signal received via its associated antenna 409-N. Unless the phase distortion at each BS antenna is calibrated, both block diagonalization and the zero-forcing (ZF) beamformer will project each UEs 406 downlink signal in random sub-spaces and the co-channel interference between UEs 406 increases as a result.

Figure 2:
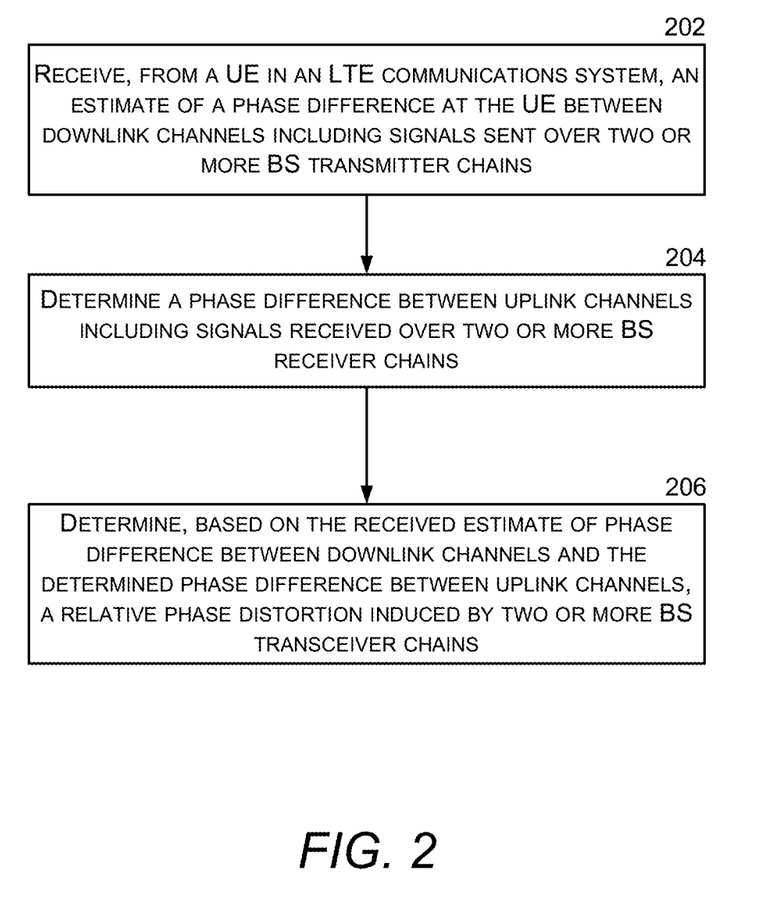
FIG. 2 is a flow diagram illustrating a method for calibrating phase hardware-induced distortion in an LTE communications system according to an aspect of the subject matter described herein.
Figure 3:
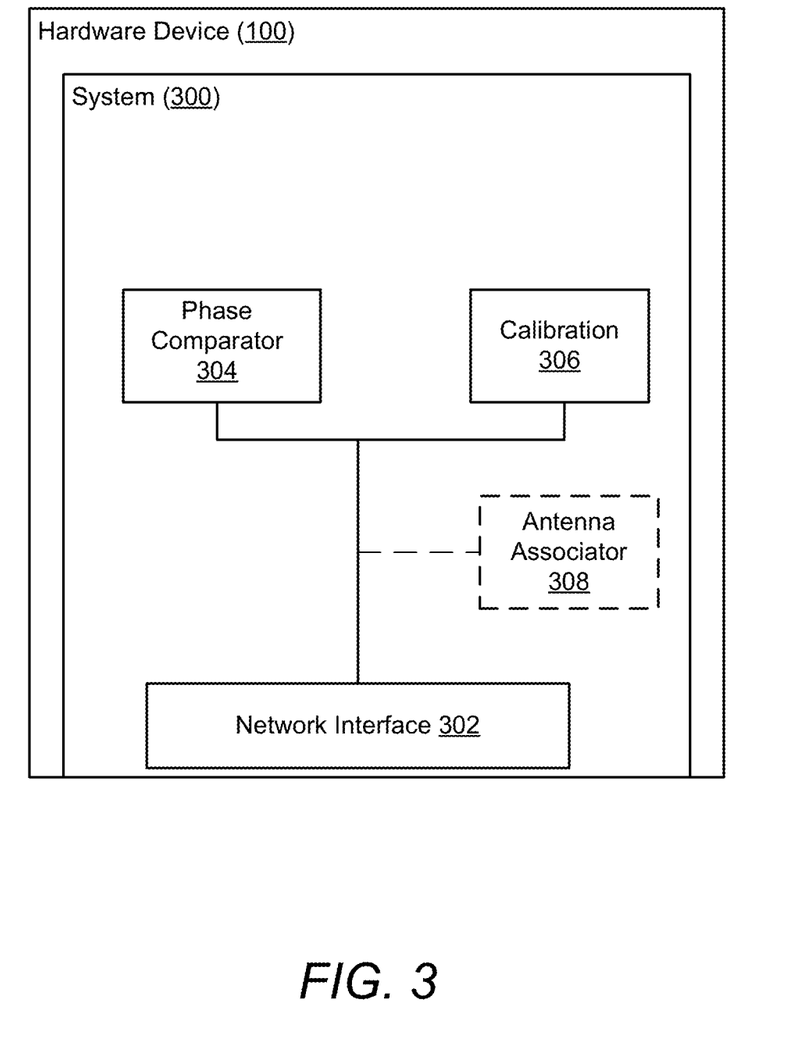
FIG. 3 is a block diagram illustrating an arrangement of components for calibrating phase hardware-induced distortion in an LTE communications system according to another aspect of the subject matter described herein.

Turning now to FIG. 2, a flow diagram is illustrated illustrating a method for calibrating phase hardware-induced distortion transceiver chains in an LTE communications system according to an exemplary aspect of the subject matter described herein. FIG. 3 is a block diagram illustrating an arrangement of components for calibrating phase hardware-induced distortion in an LTE communications system according to another exemplary aspect of the subject matter described herein. FIG. 1 is a block diagram illustrating an arrangement of components providing an execution environment configured for hosting the arrangement of components depicted in FIG. 3. The method in FIG. 2 can be carried out by, for example, some or all of the components illustrated in the exemplary arrangement in FIG. 3 operating in a compatible execution environment, such as the environment provided by some or all of the components of the arrangement in FIG. 1. The arrangement of components in FIG. 3 may be implemented by some or all of the components of the hardware device 100 of FIG. 1.

With reference to FIG. 2, in block 202 an estimate of a phase difference at a UE between downlink channels including signals sent over two or more BS transmitter chains 408 is received from the UE 406 in an LTE communications system. Accordingly, a system for calibrating phase hardware-induced distortion in an LTE communications system includes means for receiving, from a UE 406 in an LTE communications system, an estimate of a phase difference at a UE between downlink channels including signals sent over two or more BS transmitter chains 408. For example, as illustrated in FIG. 3, a network interface component 302 is configured to receive, from a UE in an LTE communications system, an estimate of a phase difference at a UE between downlink channels including signals sent over two or more BS transmitter chains 408.

In one aspect, the received rank-1 PMI feedback can be determined from an estimate of DL-CSI derived from cell-specific reference signals (CS-RS) received at the UE 406. Each UE 406 measures downlink channels based on CS-RS and computes the phase difference between the measured downlink channels. The phase difference between any two downlink channels is the sum of phase difference due to propagation delay as well as phase difference due to distortion at the BS transmitter chain associated with each transmit antenna of the BS 404. For example, as depicted in FIG. 4, the phase difference $\alpha_{1N}$ between the first downlink channel between antenna 409-1 associated with BS-1 404-1 to antenna 417-1 associated with UE-1 406-1 and the N-th downlink channel between antenna 409-N associated with BS-1 404-1 and antenna 417-1 associated with UE-1 406-1 is given by:

$$\alpha_{1N}=\varphi+(\delta_1-\delta_N), \quad (1)$$

where $\varphi$ is the phase difference caused by a difference in propagation times of signals travelling from antenna 409-1 associated with BS-1 404-1 to antenna 417-1 associated with UE-1 406-1 and from antenna 409-N associated with BS-1 404-1 to antenna 409-1 associated with UE-1 406-1.

In another aspect, the network interface component 302 can be configured to receive an estimate of a phase difference by receiving rank-1 precoding matrix indicator (PMI) feedback from the UE 406. Each UE reports a PMI, which is an index to the precoding matrix in a codebook, thereby providing a set of recommended transmission properties to BS 404. For example, the received rank-1 PMI feedback can be from a pre-defined codebook including one or more PMI codewords available at the UE 406 and the BS 404. The rank-1 PMI estimates the phase difference observed at the UE 406 across the transmit antennas. Using a codebook based rank-1 PMI, an estimate of phase difference measured in the downlink channels is reported by the UE 406 to the C-RAN 402. At least one of the one or more PMI codewords can be measured over a set of sub-bands.

Returning to FIG. 2, in block 204 a phase difference between uplink channels including signals received over two or more BS receiver chains 410 is determined at the BS 404. Accordingly, a system for calibrating phase hardware-induced distortion in an LTE communications system includes means for determining, at a BS, a phase difference between uplink channels including signals received over two or more BS receiver chains 410. For example, as illustrated in FIG. 3, a phase comparator component 304 is configured to determine, at a BS 404, a phase difference between uplink channels including signals received over two or more BS receiver chains 410.

In one aspect, the phase comparator component 304 can be configured to determine a phase difference between uplink channels by determining the phase difference from a UL-CSI estimate associated with each UE 406. For example, the UL-CSI estimate can be determined by channel estimation using received SRS symbols at the BS 404. In the C-RAN 402, a BS 404 measures the uplink channels between a UE 406 and the receive antennas at the BS 404, and determines the phase difference between the measured uplink channels. The phase difference between any two uplink channels from a UE 406 is the sum of phase difference due to propagation delay and phase difference due to distortion introduced by the receiver chain associated with each receive antenna 409 associated with the BS 404. For example, as depicted in FIG. 4, the phase difference $\beta_{1N}$ between the first uplink channel from antenna 417-1 associated with UE-1 406-1 to antenna 409-1 associated with BS-1 404-1 and the N-th uplink channel from antenna 417-1 associated with UE-1 406-1 to antenna 409-N associated with BS-1 404-1 is given by:

$$\beta_{1N}=\varphi+(\gamma_1-\gamma_N), \quad (2)$$

where $\varphi$ is the phase difference caused by a difference in propagation times of signals travelling from antenna 417-1 associated with UE-1 406-1 to antenna 409-1 associated with BS-1 404-1 and from antenna 417-1 associated with UE-1 to antenna 409-N associated with BS-1 404-1. It is to be noted from Equations (1) and (2) that the phase difference φ caused by propagation delays is reciprocal in the downlink and the uplink of a time-division duplex (TDD) system.

Returning to FIG. 2, in block 206 a relative phase distortion induced by two or more BS transceiver chains 407 is determined based on the received estimate of phase difference between downlink channels and the determined phase difference between uplink channels. Accordingly, a system for calibrating phase hardware-induced distortion in an LTE communications system includes means for determining, based on the received estimate of phase difference between downlink channels and the determined phase difference between uplink channels, a relative phase distortion induced by two or more BS transceiver chains 407. For example, as illustrated in FIG. 3, a calibration component 306 is configured to determine, based on the received estimate of phase difference between downlink channels and the determined phase difference between uplink channels, a relative phase distortion induced by two or more BS transceiver chains 407.

In one aspect, relative phase distortion at the BS transceiver chains 407 can be determined based on the phase difference of the uplink channels and the PMI-based estimate of the phase difference of the downlink channels. The UL-CSI is calibrated using the measured relative phase distortion to derive the DL-CSI. More particularly, each BS 404 receives the rank-1 PMI feedback from its designated UE 406 and also estimates the UL-CSI feedback based on the received SRS symbols. Using the rank-1 PMI and the UL-CSI estimate obtained from each UE 406, the C-RAN 402 can compute the relative phase-distortion induced by the transceiver chains 407 across multiple BS 404 antennas at the C-RAN 402. The relative phase-distortion can be averaged across multiple UE 406 reports to improve the accuracy.

In another aspect, the calibration component 306 can calibrate for the determined relative phase distortion. For example, a relative phase-distortion matrix can be constructed by forming a diagonal matrix having relative phase distortion factors as diagonal elements, where relative phase distortion of each BS transceiver chain 407 is computed with respect to a first BS transceiver chain 407-1. For example, the relative phase distortion between the transceiver chain 407-N of BS-1 404-1 with respect to transceiver chain 407-1 can be obtained as given in Equation (3) below $$\rho_{1N} = \alpha_{1N} - \beta_{1N} \quad (3)$$

Figure 5A:
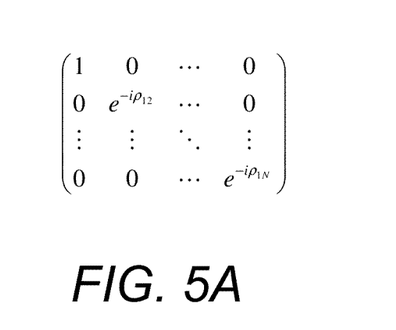
FIGS. 5A-5C illustrate exemplary matrices used for calibrating phase hardware-induced distortion in an LTE communications system according to another aspect of the subject matter described herein.

Next, a relative phase-distortion matrix is given by the matrix shown in FIG. 5A.

The UL-CSI estimate can be multiplied by a relative phase-distortion matrix for calibrating the hardware phase effects and the DL-CSI estimate is obtained. For example, the UL channel between antenna 417-1 of UE-1 406-1 to the j-th antenna of BS-1 404-1 is given by the product $e^{i\gamma_j}e^{i\varphi_{1j}}e^{i\lambda}$, where $\lambda$ is the random phase distortion introduced by the transmit chain of antenna 417-1 of UE 1 406-1, $\varphi_{1j}$ is the phase shift resulting from signal propagation from antenna 417-1 of UE-1 406-1 to antenna-j of BS-1 404-1 and $\gamma_j$ is the random phase distortion introduced by the j-th receive chain of BS-1 404-1. Therefore, the UL-CSI between UE-1 406-1 and all N antennas of BS-1 404-1 is given by the channel vector shown in FIG. 5B.

Figure 5B:
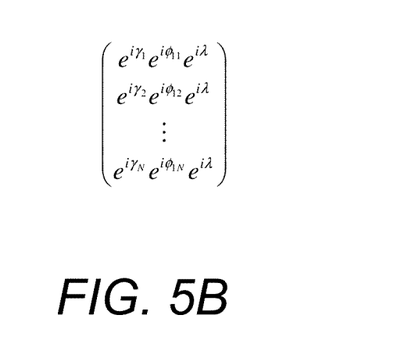
Figure 5C:
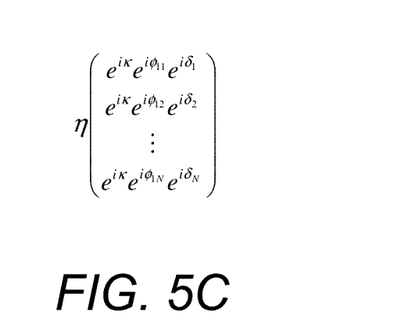

Multiplying the UL-CSI channel vector shown in FIG. 5B by the relative phase distortion matrix shown in FIG. 5A and substituting for p, a and 13 using Equations (1), (2) and (3), results in a scaled DL-CSI vector shown in FIG. 5C, where a downlink channel from the j-th antenna of BS-1 to antenna 417-1 of UE-1 is $e^{i\kappa}e^{i\varphi_{1j}}e^{i\delta_j}$, $\kappa$ is the random phase distortion introduced by the receive chain 416-1 of UE 1, $\varphi_{1j}$ is the phase shift resulting from signal propagation from antenna-j of BS-1 to antenna 417-1 of UE-1 and $\delta_j$ is the random phase distortion introduced by the j-th transmit chain of BS-1, and $\eta$ is a scalar quantity given by $$\eta = \frac{e^{i(\lambda - \kappa)}}{e^{i(\delta_1 - \gamma_1)}}.$$

The DL beamformer can be designed based on the scaled DL-CSI vector shown in FIG. 5C.

In another aspect, as described above, CS-RS is received at the UE 406. More particularly, the BS 404 transmit antennas 409 for the C-RAN 402 can be partitioned into sets, where each set is assigned to a certain CS-RS. Each BS 404 transmit antenna 409 may be assigned to a different set, as required by the C-RAN 402.

Returning to FIG. 3, an optional antenna associator component 308 can be included in system 300 to change which antennas are associated with a cell ID. In one aspect, the antenna associator component can be configured to change which antennas are associated with a cell ID by dividing antennas into disjoint cell ID specific sets, assigning a unique sequence to each cell ID specific set, scrambling CS-RSs by the assigned unique sequence, transmitting the scrambled CS-RSs by all antennas within each cell ID specific set, and hopping one or more antennas from one cell ID specific set to another cell ID specific set. For example, one or more antennas can be hopped sequentially across cell ID specific sets.

The approach described above does not require hardware calibration, since the phase-induced hardware distortion is compensated for, and the approach is based on existing PHY signals defined by LTE R8 and beyond standard. Accordingly, an advantage of this approach is that it can be transparent to the UEs 406, as only the CRAN 402 performs calibration steps periodically.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

Preferred embodiments are described herein, including the best mode known to the inventor for carrying out the claimed subject matter. One of ordinary skill in the art should appreciate after learning the teachings related to the claimed subject matter contained in the foregoing description that variations of those preferred embodiments may become apparent to those of ordinary skill in the art upon reading the foregoing description. The inventor intends that the claimed subject matter may be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A method for calibrating phase hardware-induced distortion in a cellular communications system, the method comprising:
   obtaining an estimate of a phase difference between estimated downlink channels obtained at a user equipment (UE) from signals sent over two or more base station (BS) transmitter chains;
   determining a phase difference between estimated uplink channels obtained from signals received over two or more BS receiver chains; and
   determining, based on the obtained estimate of phase difference between estimated downlink channels and the determined phase difference between estimated uplink channels, a relative phase distortion induced by two or more BS transceiver chains including the two or more BS transmitter chains and the two or more BS receiver chains.

2. The method of claim 1 further comprising calibrating for the determined relative phase distortion.

3. The method of claim 1 wherein obtaining an estimate of a phase difference between estimated downlink channels includes receiving rank-1 precoding matrix indicator (PMI) feedback from the UE.

4. The method of claim 3 wherein the received rank-1 PMI feedback is from a pre-defined codebook including one or more PMI codewords available at the UE and a base station associated with the BS transmitter chains.

5. The method of claim 4 wherein at least one of the one or more PMI codewords is measured over a set of sub-bands.

6. The method of claim 3 wherein the received rank-1 PMI feedback is determined from an estimate of downlink channel state information (DL-CSI) derived from cell-specific reference signals received at the UE.

7. The method of claim 1 wherein determining a phase difference between estimated uplink channels includes determining the phase difference from an uplink channel state information (UL-CSI) estimate associated with the UE.

8. The method of claim 7 wherein the UL-CSI estimate is determined by channel estimation using received sounding reference signal (SRS) symbols at a BS associated with the BS receiver chains.

9. The method of claim 1 further comprising changing which BS antennas are associated with a cell ID associated with a cell served by a BS associated with the BS receiver chains.

10. The method of claim 9 wherein changing which antennas are associated with a cell ID includes:
   dividing antennas into disjoint cell ID specific sets;
   assigning a unique sequence to each cell ID specific set;
   scrambling cell-specific reference signals by the assigned unique sequence;
   transmitting the scrambled cell-specific reference signals by all antennas within each cell ID specific set; and
   hopping one or more antennas from one cell ID specific set to another cell ID specific set.

11. The method of claim 10 wherein hopping one or more antennas includes hopping one or more antennas sequentially across cell ID specific sets.

12. A system for calibrating phase hardware-induced distortion in a cellular communications system, the system comprising:
   means for obtaining an estimate of a phase difference between estimated downlink channels obtained at a UE from signals sent over two or more BS transmitter chains;
   means for determining a phase difference between estimated uplink channels obtained from signals received over two or more BS receiver chains; and
   means for determining, based on the obtained estimate of phase difference between estimated downlink channels and the determined phase difference between estimated uplink channels, a relative phase distortion induced by two or more BS transceiver chains including the two or more BS transmitter chains and the two or more BS receiver chains.

13. A system for calibrating phase hardware-induced distortion in cellular communications system, the system comprising system components including:
   a network interface component configured to obtain an estimate of a phase difference between estimated downlink channels obtained at a UE from signals sent over two or more BS transmitter chains;
   a phase comparator component configured to determine a phase difference between estimated uplink channels obtained from signals received over two or more BS receiver chains; and
   a calibration component configured to determine, based on the obtained estimate of phase difference between estimated downlink channels and the determined phase difference between estimated uplink channels, a relative phase distortion induced by two or more BS transceiver chains including the two or more BS transmitter chains and the two or more BS receiver chains.

14. The system of claim 13 wherein the calibration component is configured to calibrate for the determined relative phase distortion.

15. The system of claim 13 wherein the network interface component is configured to obtain the estimate of a phase difference by receiving rank-1 PMI feedback from the UE.

16. The system of claim 15 wherein the received rank-1 PMI feedback is from a pre-defined codebook including one or more PMI codewords available at the UE and a base station associated with the BS transmitter chains.

17. The system of claim 16 wherein at least one of the one or more PMI codewords is measured over a set of sub-bands.

18. The system of claim 15 wherein the received rank-1 PMI feedback is determined from an estimate of DL-CSI derived from cell-specific reference signals received at the UE.

19. The system of claim 13 wherein the phase comparator component is configured to determine the phase difference between uplink channels by determining the phase difference from an UL-CSI estimate associated with the UE.

20. The system of claim 19 wherein the UL-CSI estimate is determined by channel estimation using received SRS symbols at a BS associated with the BS receiver chains.

21. The system of claim 13 further comprising an antenna associator component to change which BS antennas are associated with a cell ID associated with a cell served by a BS associated with the BS receiver chains.

22. The system of claim 21 wherein the antenna associator component is configured to change which antennas are associated with a cell ID by:
 dividing antennas into disjoint cell ID specific sets;
 assigning a unique sequence to each cell ID specific set;
 scrambling cell-specific reference signals by the assigned unique sequence;
 transmitting the scrambled cell-specific reference signals by all antennas within each cell ID specific set; and
 hopping one or more antennas from one cell ID specific set to another cell ID specific set.

23. The system of claim 22 wherein the antenna associator component is configured to hop one or more antennas by hopping one or more antennas sequentially across cell ID specific sets.

24. A non-transitory computer readable medium storing a computer program, executable by a machine, for calibrating phase hardware-induced distortion in a cellular communications system, the computer program comprising executable instructions for:
 obtaining an estimate of a phase difference between estimated downlink channels obtained at a UE from signals sent over two or more BS transmitter chains;
 determining a phase difference between estimated uplink channels obtained from signals received over two or more BS receiver chains; and
 determining, based on the obtained estimate of phase difference between estimated downlink channels and the determined phase difference between estimated uplink channels, a relative phase distortion induced by two or more BS transceiver chains including the two or more BS transmitter chains and the two or more BS receiver chains.

* * * * *